United States Patent [19]
Schwartz

[11] 3,836,982
[45] Sept. 17, 1974

[54] LOW INERTIA ELECTRONIC CAMERA SHUTTER

[75] Inventor: Joseph E. Schwartz, Irondequoit, N.Y.

[73] Assignee: Opto Dynetics Inc., Rochester, N.Y.

[22] Filed: July 23, 1973

[21] Appl. No.: 381,757

[52] U.S. Cl................................. 354/234, 354/264
[51] Int. Cl. ............................................ G03b 9/22
[58] Field of Search............ 95/53 EA, 63; 354/234, 354/264

[56] References Cited
UNITED STATES PATENTS
3,654,847   4/1972   Schwartz................................. 95/63

*Primary Examiner*—Samuel S. Matthews
*Assistant Examiner*—Michael L. Gellner

[57] ABSTRACT

A low inertial electronic camera shutter is disclosed wherein a ring member coaxially aligned with a bore in a housing pivotally moves a plurality of shutter blades in registry with the bore between open and closed positions for controlling light radiation through the bore. In accordance with the invention, a low inertial means including a longitudinal wire member connected between the ring member and the frame at a pivot point thereon, drives the plurality of shutter blades between the two positions in response to a pulse applied to a solenoid having an armature connected to the wire member at a point thereon to amplify armature movement. The camera shutter includes a flash means including an electrical contact switch actuated by the ring member when the shutter blades are driven into the open position.

10 Claims, 5 Drawing Figures

3,836,982

LOW INERTIA ELECTRONIC CAMERA SHUTTER

BACKGROUND OF THE INVENTION

1. Field of the Invention

The present invention relates to photographic cameras and more particularly to an electronic camera shutter.

2. Prior Art

Camera shutters are well known in the art and typical shutters pertinent to the present invention are U.S. Pat. Nos. 3,593,636; 3,604,330; 3,611,901 to Paul Fahlenberg; No. 3,603,229 to Rolf Noack and No. 3,654,847 to Joseph E. Schwartz. There are a number of difficulties with prior art camera shutters including the fact that they include many elements, are not as fast acting as desired, include many parts which have relatively high inertia and friction, are relatively expensive to manufacture and therefore are of relatively high cost. Accordingly, there is a pressing need for an improved electronic camera shutter which possesses relatively low inertial design, is fast acting, is relatively inexpensive to manufacture and is more reliable than prior art camera shutters.

SUMMARY OF THE INVENTION

In accordance with a preferred embodiment of the invention, a low inertia electronic camera shutter includes a housing having a bore along an axis, a plurality of shutter blades disposed within the housing in registry with the bore and a ring member also coaxially aligned with the bore and connected to the plurality of shutter blades for pivotally moving the plurality of shutter blades between an open position and a closed position for controlling the transmission of light through the bore of the housing. The ring member is rotatable coaxially about the axis of the bore and may be so rotated in response to a pulse applied to at least one solenoid. The solenoid includes an armature coupled to a low inertia, light, longitudinal wire member which is pivotally connected to the ring member and to the frame. The armature is connected to the wire at a point to amplify the movement of the armature so that the ring member rotates accordingly to pivot the plurality of shutter blades into the open position. Also included is a spring return member which is connected to the ring member for yieldingly urging the plurality of shutter blades into the closed position at the termination of the pulse applied to the solenoid. The shutter includes electrical contacts under the control of ring member for completing a flash circuit when the shutter blades are moved into an open position.

BRIEF DESCRIPTION OF THE DRAWINGS

The invention will be better understood upon consideration of the following detailed description taken together with the accompanying drawings in which.

DESCRIPTION OF THE PREFERRED EMBODIMENT

Figure 1:
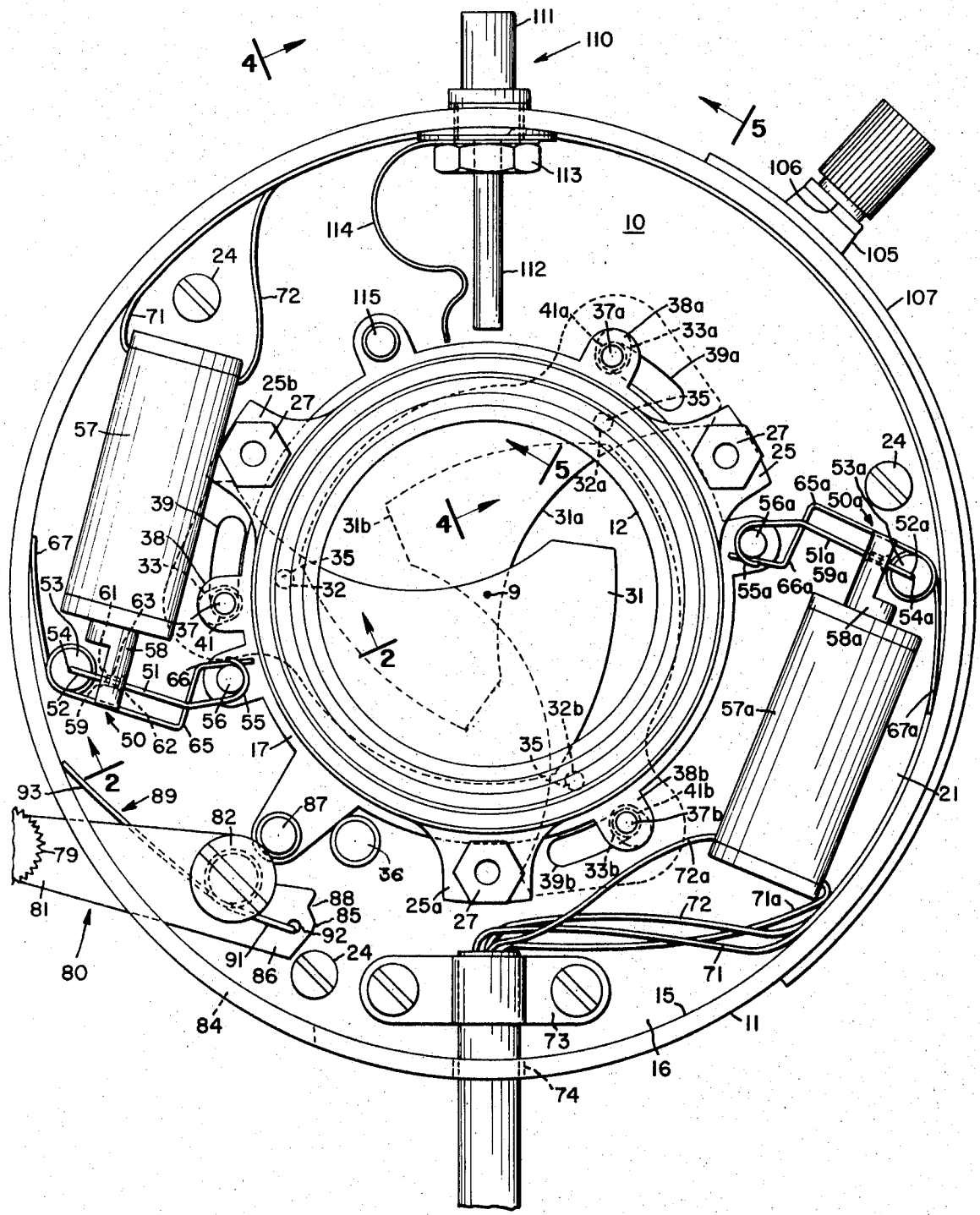
FIG. 1 is a rear elevational view of the low inertia electronic camera shutter made in accordance with a preferred embodiment of the invention, the shutter being illustrated in its closed position.

Referring now to the drawings, a low inertia electronic camera shutter 10 in accordance with the invention is shown in all the FIGS. 1-5. The shutter 10 illustrated, is a between-the-lens shutter; however, it should be understood that the present invention may be utilized on other types of camera shutters. The low inertia electronic camera shutter 10 comprises a housing 11 having a round bore 12 therethrough for the passage and radiation of light through the housing 11 along a central axis 9 of the bore 12. The housing 11 includes external mounting threads 13 and internal mounting threads 14 for receiving and fastening thereto various camera lenses (not shown). The housing 11 includes another concentric bore 15 which defines a cavity or chamber 16 for receiving and housing the various structural elements of the invention to be described hereinafter. The bore 15 is larger than the bore 12. The shutter 10 includes a moving rotatable ring member 17 which includes an annular opening 18 concentric with the bore 12 of the housing 11. The ring member 17 is rotatably mounted coaxially about the bore 12 and secured to the housing 11 between a mounting plate 21 and a retaining ring and sleeve member 19. The mounting plate 21 is fastened inside the housing 11 by the three screws 24. The mounting plate 21 is a circular plate and includes a concentric opening 23 which is coaxial with the bore 12. The diameter of the mounting plate 21 is such that it will slip into the circular chamber 16 and thus be self-locating. The retaining ring and sleeve member 19 include an annular concentric groove 20 for slideably receiving the ring member 17 and adapted to slip into a counterbore hole 23a in the plate 21 so as to be coaxial with the bore 12. The length of the groove 20 is longer than the width of the ring member 17 so that the ring member 17 is free to rotate when the retaining ring and sleeve member 19 include three side mounting flanges 25, 25a, 25b, which cooperate with three flange screws 27 for securing the retaining ring and sleeve member 19 to plate 21. The retaining ring and sleeve member 19 include a concentric internal threaded bore 28 which may be used to secure the shutter 10 to a camera in a manner well known to those skilled in the art.

Figure 3:
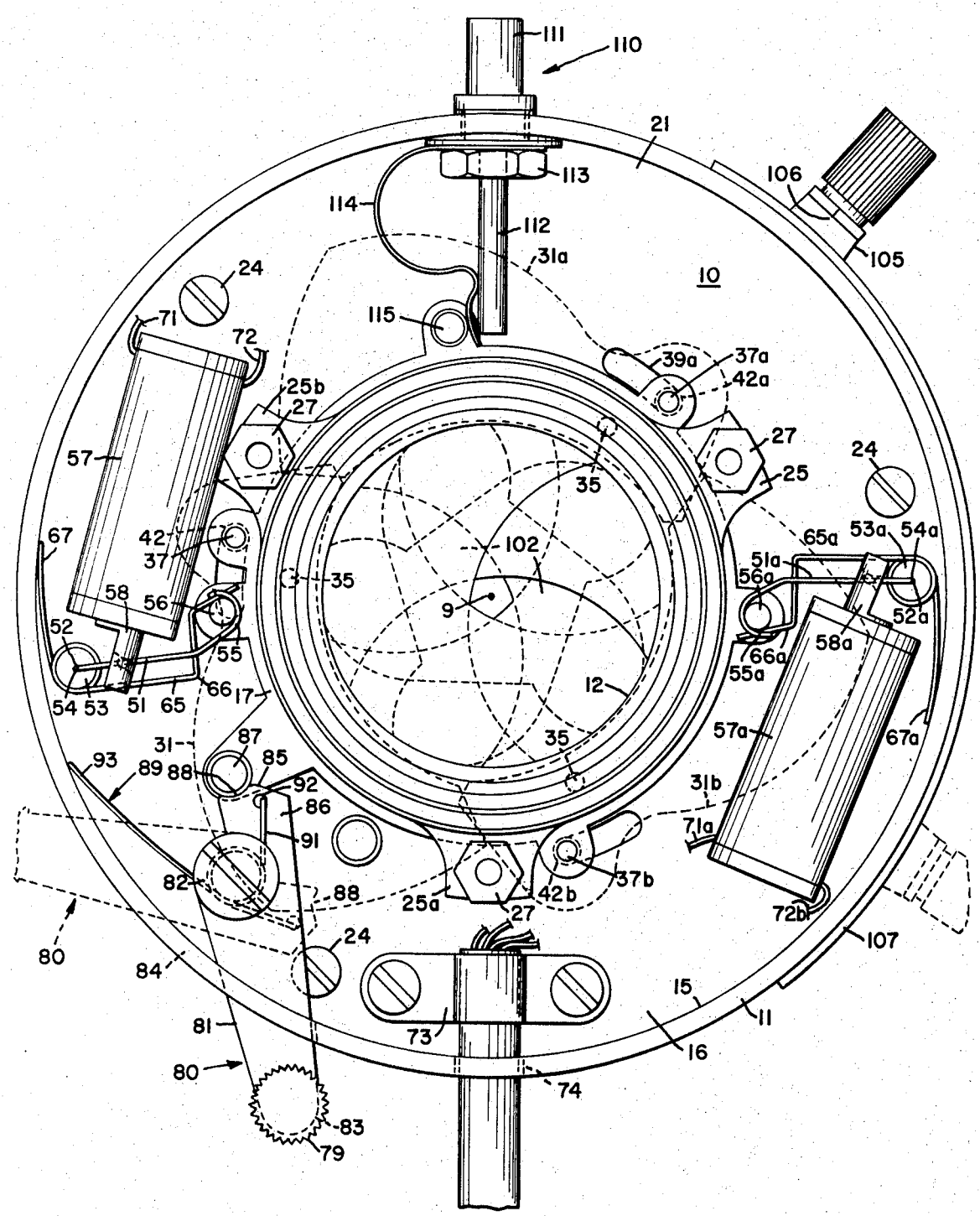
FIG. 3 is another rear elevational view of the shutter of FIG. 1, showing the shutter in its open position.

In accordance with the invention, the ring member 17 pivotally drives three similar shutter blades 31, 31a, 31b between open and closed positions for controlling the radiation of light through the bore 12 of the housing 11. The shutter blades 31, 31a, 31b are pivotally mounted within a circular recessed bore 34 of the housing 11. The shutter blades 31, 31a, 31b are movably retained within the circular recessed bore 34 between the mounting plate 21 and an iris plate 100. The details of the shutter blades 31, 31a, 31b, housing 11 and ring member 21 are shown in detail in FIG. 5. The shutter blades 31, 31a, 31b are pivotally mounted about pivot pins 35 which are fixed to the mounting plate 21 and disposed in corresponding holes 32, 32a, 32b in the shutter blades 31, 31a, 31b. The pivot pins 35 are set 120° apart about the bore 12 of the housing 11. The shutter blades 31, 31a, 31b are pivoted about the pins 35 by the movable ring member 17 through drive pins 37 which are fixed to the ring member 17 and disposed in slightly elongated slots 33, 33a, 33b of the blades 31, 31a, 31b respectively, in a manner shown in FIG. 5. The drive pins 37, 37a, 37b are fixed to the ring member 17 at 38, 38a, 38b such as by riveting, welding or upsetting. The drive pins 37 move in a circular path within arcuate elongated slots 39, 39a, 39a within the mounting plate 21. The arcuate elongated slots 39, 39a, 39b also serve to limit the travel of the drive pins 37, 37a, 37b and the shutter blades 31, 31a, 31b between their open and closed positions; thus, as seen in FIG. 1, the shutter blades 31, 31a, 31b are in the closed position and the drive pins 37, 37a, 37b are at the closed ends 41, 41a, 41b of the arcuate elongated slots 39, 39a, 39b. In FIG. 3, the shutter blades 31, 31a, 31b are shown in their open position and the drive pins 37, 37a, 37b are at the corresponding closed ends 42, 42a, 42b of the arcuate elongated slots 39, 39a, 39b. Thus, the individual length of each of the arcuate elongated slots 39, 39a, 39b is such that the shutter blades 31, 31a, 31b may be driven between the open and closed positions as illustrated in FIGS. 1 and 3. A stop pin 36 is fixed normal to plate 21.

In accordance with the invention, the shutter blades 31, 31a, 31b are driven between the open and closed positions by a low inertia drive means 50 at a relatively high speed. In the preferred embodiment, two similar low inertia drive means 50 and 50a are employed since the combination produces a force couple which acts upon the ring member 17 to drive the shutter blades 31, 31a, 31b into the open and closed positions at a still faster speed than single low inertia means 50 of the present invention and much faster than devices of the prior art. The low inertia drive means 50, 50a are of similar construction and accordingly, like structural elements have the same identifying numerals except that the low inertia means 50a includes a small letter "a" after each of the numerals to show the corresponding structural element of low inertia means 50.

Figure 2:
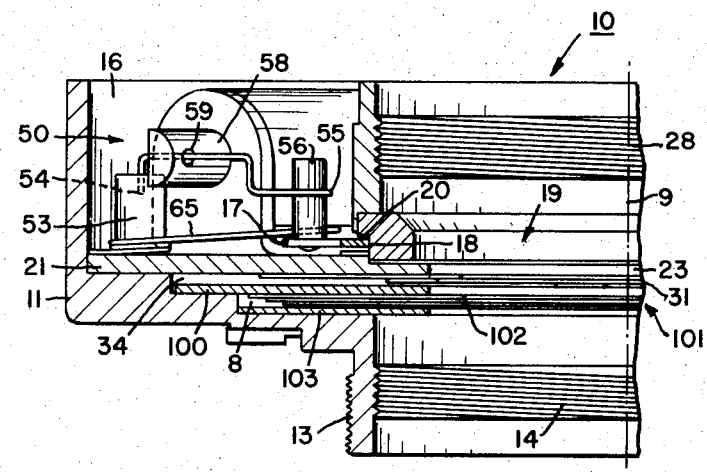
FIG. 2 is a sectional side elevational view of the shutter of FIG. 1 taken along line 2—2.

The low inertia means 50 is shown in detail in FIGS. 1, 2 and 3 and includes a relatively light longitudinal wire member 51 pivotally mounted at one end 52 in a bearing hole 54 within a post 53 fixed to the mounting plate 21. The light longitudinal wire member 51 includes a coupling loop 55 at the opposite end which is coupled to a drive pin 56. The drive pin 56 is fixed to the ring member 17 for driving the ring member 17 in a clockwise or counter-clockwise direction.

The low inertia means 50 includes a solenoid 57 having an armature 58 coupled to the light longitudinal wire member 51 between the loop 55 and post 53 proximal to the post 53 so as to amplify armature 58 movement at the coupling loop end of the light longitudinal wire member 51. The armature 58 includes a hole 59 countersunk at both ends 61 and 62 to define a fulcrum at 63. The longitudinal wire 51 extends through the hole 59 and is acted upon by the armature 58 at the fulcrum 63. The solenoid 57 is fixed to the mounting plate 21 and the armature 58 is substantially normal to the light longitudinal wire member 51 when the shutter blades 31, 31a, 31b are in closed position. This is desirable since the solenoid 57 operates in a pull mode and thus the greater mechanical advantage is required at the start of the armature travel. This is an advantage since not only is there an amplification of movement of the armature 58 with respect to the ring member 17 as just described, but also the armature 58 is acted upon by a relatively high magnetic force at a point within the solenoid 57, when electrically energized so that the greatest force is produced to drive the shutter blades 31, 31a, 31b into the open position when the wire member 51 is not normal to the armature 58. That is, by the use of a pull mode, the armature 58 is pulled into the magnetic field generated within the solenoid 57 and the greatest force used is when the wire member 51 and armature 58 are not normal. The low inertia means 50 further includes a shutter blade return spring 65 which is mounted about the post 53 and includes one portion 66 coupled to the drive pin 56 and another portion 67 coupled to the housing 11 for yieldingly urging the shutter blades 31, 31a, 31b into the closed position and the corresponding pins 37, 37a, 37b against the ends 42, 42a, 42b of the arcuate elongated slots 39, 39a, 39b. The solenoid 57 is energized by electrical signal pulses applied by way of lead wires 71, 72.

The low inertia means 50a is also fixed to the mounting plate 21 and includes a solenoid 57a which may be energized by electrical signal pulses applied by way of leads 71a and 72a. The lead wires 71, 71a, 72, 72a are clamped to the mounting plate 21 by a clamp 73 and extend through a hole 74 in the housing 11.

As was mentioned previously, the low inertia means 50 and 50a produce a force couple to rapidly open and close the shutter blades 31, 31a, 31b. This may now be seen by viewing FIGS. 1 and 3. The low inertia means 50 and 50a each includes the wire members 51 and 51a having coupling loops 55 and 55a respectively and pivot posts 53, 53a, at holes 54, 54a respectively. The solenoids 57 and 57a include armatures 58 and 58a respectively which act normal to the wire members 51 and 51a in a clockwise direction to drive the shutter blades 31, 31a, 31b into the open position. The shutter return springs 65 and 65a also act together upon the drive pins 56 and 56a to produce a force couple in the counter-clockwise direction to drive the shutter blades 31, 31a 31b in the closed position. The means 50, 50a are 180° apart.

Referring now to FIG. 3, a manually operable lever means 80 is shown for latching the shutter blades 31, 31a, 31b in their open position for the purpose of focusing or viewing. The manually operable lever means 80 includes a lever 81 pivotally mounted on a post 82 which is fixed to the mounting plate 21. The lever 81 has an outer end 83 which projects radially through a slot 84 in the annular wall of the housing 11 to the exterior thereof so that it may be pivotally moved about the post 82. To facilitate the gripping of the outer end 83, a knurl knob 79 is fixed to the outer end 83 of the lever 81. The lever 81 includes a camming surface 85 at its other end 86. The camming surface 85 coacts with a pin 87 which is fixed to the ring member 17. The camming surface 85 includes a notch 88 which engages the pin 87 to retain the shutter blades 31, 31a, 31b in the open position. When the shutter blades 31, 31a, 31b are in the open position, the ring member 17 is spring biased by the spring 65 and the pin 87 is urged in a counter-clockwise direction against the notch 88 to hold the lever 81 in a cocked position. A coiled tension spring 89 surrounds post 82 and is fixed at one end 91 in an opening 92 in the lever 81. The coil tension spring 89 also includes an end 93 which is biased against an inner surface of the housing 11 normally to urge the lever 81 into its extreme clockwise position about post 82. The operable lever means 80 in FIG. 3 is shown in the two positions in which it may be placed. The lever 81 is shown by full lines in the open position, that is the position in which the shutter blades 31, 31a, 31b are disposed to permit the radiation of light through the bore 12 of the housing 11. The lever 81, shown by dotted lines, is disposed in the rest position, that is the position in which the shutter blades 31, 31a, 31b are in the closed position. The coiled spring 89 yieldingly urges the lever 81 in its extreme clockwise position about post 82. The manually operated lever means 80 may be manually moved clockwise and counter-clockwise about the post 82 to open and close the shutter blades 31, 31a, 31b as just mentioned, or the lever means 80 may be manually actuated to open the shutter blades 31, 31a, 31b and electrically operated to close the shutter blades 31, 31a, 31b by applying an electrical pulse to the solenoids 57, 57a. When a signal pulse is applied to the solenoids 57, 57a, the armatures 58, 58a operate in a pull mode to turn the ring member 17 in a clockwise direction by a sufficient angular displacement to unseat the pin 87 from the notch 88 of the lever 81 so that the lever 81 rotates clockwise away from the pin 87 and at the termination of the signal pulse, the spring 65 returns the shutter blades 31, 31a, 31b to the closed position by rotating the ring member 17 in the counter-clockwise direction against pin 36.

Figure 4:
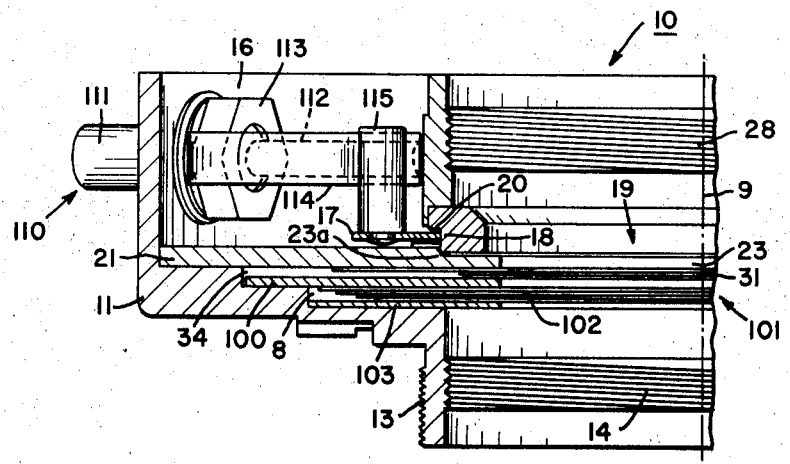
FIG. 4 is a section of the shutter taken along line 4—4 illustrating details of the invention.
Figure 5:
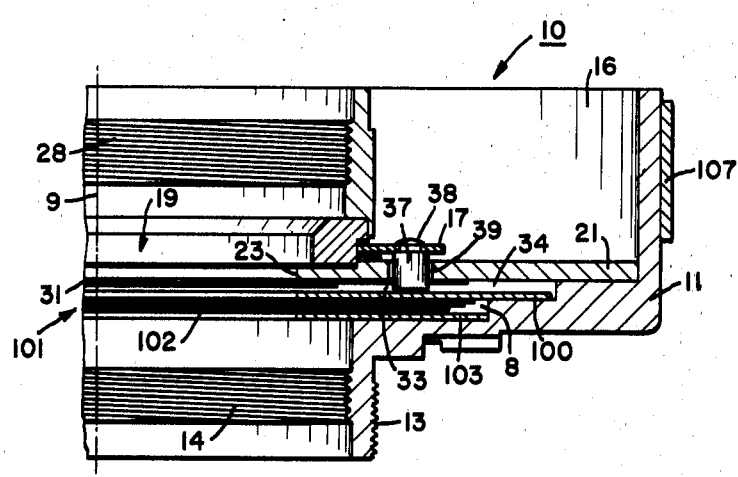
FIG. 5 is another section through the shutter along line 5—5 showing details of the iris and shutter blades.

Referring now to FIGS. 1, 3 and 4, the shutter 10 includes a flash means 110 for electrically completing a flash circuit (not shown). The flash means 110 includes an electrical jack receptacle 111 which terminates in an electrically conducting post 112 in the chamber 16 and is fastened to the housing 11 by a nut 113. The post 112 and the jack receptacle 111 are electrically insulated from the housing 11. The flash means 110 includes a resilient conducting spring contact 114 which is normally biased away from the post 112 and lies within the arcuate pathe of an insulated contact pin 115 fixed to the ring member 17 so that when the ring member 17 is rotated to open the shutter blades 31, 31a, 31b, the insulated contact pin 115 urges the spring contact 114 against the post 112 to complete an electrical circuit when the shutter blades 31, 31a, 31b are in the open position (see FIG. 3).

The shutter 10 as shown in FIG. 3 includes an iris 101 for restricting the opening of the bore 12 in a manner well known to those skilled in the art. The iris 101 includes a plurality of pivotally mounted iris blades 102 disposed between an iris plate 100 and a counter bore 8 in the housing 11. The iris blades 102 are under the control of an iris drive plate 103 which pivots the iris blades 102 between open and closed positions and various positions therebetween. The iris drive plate 103 is coupled to a control lever 105 disposed outside of the housing 11 for manipulation of the iris blades 102 between the open and closed positions (FIG. 3). The control lever 105 includes a pointer 106 and indicia plate 107 for indicating the various positions of the iris blades 102 and thus controlling the opening of the bore 12 for the passage of light therethrough. The iris 101 is well known to those skilled in the art.

In the operation of the low inertia electronic camera shutter 10, the shutter blades 31, 31a, 31b are driven from their normally closed position (FIG. 1) into the open position (FIG. 3) in response to an electrical signal pulse applied to the solenoids 57, 57a of the low inertia means 50, 50a respectively by way of lead wires 71, 72, 71a, 72a respectively. The shutter blades 31, 31a, 31b will remain in the open position as a function of the time duration of the signal pulse. The signal pulse preferably is a square wave pulse; however, the other wave shapes may be used without departing from the invention. When the solenoids 57, 57a are energized by the signal pulse, the armatures 58, 58a are pulled into the solenoids 57, 57a in a pull mode and act at their fulcrum 63, 63a on wire members 51, 51a to pivot the light wire member 51, 51a about the bearing hole 54 on post 53 in a counter-clockwise direction. This action is initiated on the leading edge of the square wave pulse. The coupling loop 55, 55a of the wire members 51, 51a in response to the pivoting of the wire member 51, 51a drive the ring member 17 in a clockwise direction by a resulting "force couple" derived from the solenoids 57, 57a and the wire members 51, 51a. In response to the clockwise forces acting on the ring member 17, the ring member 17 is rotated clockwise and acts on each of the shutter blades 31, 31a, 31b by drive pin 37, 37a, 37b to pivot the shutter blades 31, 31a, 31b about their corresponding pivot pins 35 into the open position (FIG. 3). At the termination of the signal pulse or at its trailing edge, the solenoids 57, 57a are deenergized and the armatures 58, 58a are returned to a rest position (FIG. 1) by the return spring 65, 65a. The shutter blade return springs 65, 65a during the signal pulse are yieldingly overpowered by the clockwise forces action of the pins 56, 56a and ring member 17 and at the termination of the signal pulse and clockwise forces act on the pins 56, 56a to drive the ring member 17 in a counter-clockwise direction to return the shutter blades 31, 31a, 31b to the closed position (FIG. 1). Thus, normally, the shutter blades 31, 31a, 31b are in the closed position (FIG. 1) and are driven to the open position (FIG. 3) in response to the electrical signal pulse.

It may now be seen that the shutter blades 31, 31a, 31b are driven between the open and closed positions by low inertia means 50, 50a which include the low mass wire member 51, 51a and shutter return spring 65, 65a. Further, since each of the low inertia means 50, 50a act about common posts 53, 53a respectively and common drive pins 56, 56a respectively, there is a minimum of backlash and play between the low inertia means 50, 50a and the ring member 17.

The iris 101 acts independent of the shutter blades 31, 31a, 31b and controls the light aperature or opening of the bore 12 for the passage of light therethrough by a radial movement of the lever 105 about axis 9 between the radial positions shown in FIG. 3. The iris blades 102 are thus rotated to the various positions to restrict light radiation through the bore 12 in a manner well known to those skilled in the art. Since the iris 101 is independent of the shutter blades 31, 31a, 31b, greater control on the shutter blades 31, 31a, 31b can be had since the blades 31, 31a, 31b are always driven to the same open and closed positions in response to the electrical signal pulse.

The flash means 110 is under the control of the ring member 17 which in turn is under the control of the low inertia means 50, 50a. When the ring member 17 is rotated in a clockwise direction, the resilient spring contact 114 is urged against the post 112 by the pin 115 to complete an electrical circuit when the shutter blades 31, 31a, 31b are in the open position (FIG. 3). When the ring member 17 is rotated counter-clockwise, the spring contact 114 moves away from the post 112 to a rest position (FIG. 1).

The lever means 80 may be used for opening or closing the shutter blades 31, 31a, 31b for focusing purposes. When the lever 80 is pivoted about post 82 in a counter-clockwise direction, the ring member 17 is rotated clockwise by the lever 81 and the shutter blades 31, 31a, 31b are driven to the open position. The shutter blades 31, 31a, 31b are held in the open position by latching the pin 87 in the notch 88 of the lever 81.

Normally, the lever means 80 is manually operated to open or close the shutter blades 31, 31a, 31b. However, as previously mentioned, the shutter blades may be returned to the closed position in response to the electrical signal pulse applied to the solenoids 57, 57a. The solenoids 57, 57a, in response to the signal pulse, pull the armature inward, thus pivoting the wire members 65, 65a about post 52, 52a counter-clockwise. The wire members 65, 65a in turn rotate the ring member 17 clockwise until the pin 87 is displaced from the notch 88. When the pin 87 is displaced from the notch 88, the lever 81 is pivoted clockwise about post 82 to its rest position while ring member 17 rotates counter-clockwise until it engages stop pin 36 (FIG. 1).

The low inertia electronic camera shutter 10 has many features and advantages over camera shutters of the prior art. For example, the shutter 10 features light weight wire members 51, 51a for coupling the mechanical movement of the armatures 58, 58a to the ring member 17. The wire members 51, 51a have a low mass and therefore low inertia. The return springs 65, 65a have a low mass and coact against the wire members 51, 51a at the pins 56, 56a to reduce backlash and play. The return spring 65 and the wire member 51 are both mounted about the post 53 and therefore have a common post or mounting point to reduce backlash and space requirement within the shutter 10.

The invention has been described in detail with reference to the preferred embodiment thereof, but it will be understood that variations and modifications can be effected within the spirit and scope of the invention.

What is claimed is:

1. A camera shutter comprising:
   a. a housing having a bore along an axis thereof,
   b. a ring member having an annular opening concentric with said bore of said housing along said axis,
      i. said ring member being rotatable within said housing about said axis,
   c. a plurality of shutter blades disposed within said housing in registry with said bore and said axis of said housing,
      i. said blades being pivotally connected in cooperative relationship with said ring member for pivotal movement between a closed position and an open position for controlling light radiation through said bore, and
   d. low inertia means connected between said housing and said ring member for pivotally moving said shutter blades selectively into said open position and said closed position,
      i. said low inertia means includes a relatively light longitudinal wire member connected at one end to said ring member and at the opposite end to a pivot point on said housing,
      ii. said low inertia means further includes a pulse responsive solenoid means having an armature connected to said wire member at a point between said opposite ends for pivoting said plurality of shutter blades into said open position in response to an electrical signal pulse applied to said solenoid means, and
      iii. said low inertia means further includes a spring member connected at said pivot point on said housing for yieldingly urging said plurality of shutter blades into said closed position at the termination of said electrical pulse.

2. A camera shutter comprising:
   a. a housing having a bore along an axis thereof,
   b. a ring member means having an annular opening rotatable about said axis within said housing,
   c. a plurality of shutter blades in registry with said bore and coupled to said ring member means for movement between open and closed positions for controlling light radiation through said bore in response to rotation of said ring member means in clockwise and counter-clockwise directions,
   d. low inertia means including a low mass wire member pivotally connected at one end to a post fixed relative to said housing and to said ring member at the other end thereof,
      i. said low inertia means includes a solenoid fixed to said housing and having a movable armature connected to said wire member proximal to said one end for rotating said ring member means in a clockwise direction to drive said plurality of shutter blades in said open position in response to an electrical signal pulse applied to said solenoid, and
      ii. return spring means disposed about said post and connected to said housing and said ring member for yieldingly driving said ring member means in a counter-clockwise direction so that said plurality of shutter blades are returned to the closed position at the termination of said electrical signal pulse.

3. The invention defined in claim 2 wherein said armature and said low mass wire member are normal to each other when said shutter blades are in the closed position.

4. The invention defined in claim 2 wherein said low mass wire member is relatively stiff and light.

5. The invention defined in claim 2 wherein said post is a common mounting post for supporting said wire member and said return spring means.

6. The invention defined in claim 2 wherein said ring member includes a drive pin fixed thereon and said wire member and said return spring means are coupled to said drive pin for rotating said ring member in said clockwise and counter-clockwise directions.

7. The invention defined in claim 2 wherein said low inertia means includes a second low mass wire member pivotally connected to one end thereof to a second post fixed relative to said housing and to said ring member at the other end thereof diametrically opposed to said low mass wire member,
   i. said low inertia means further includes a second solenoid having another armature connected to said second wire member for rotating said ring member in a clockwise direction to drive said plurality of shutter blades in said open position in response to an electrical single pulse applied to said solenoid and said second solenoid,
   ii. second return spring means connected about said another post for yieldingly driving said ring member means in a clockwise direction so that said plurality of shutter blades return to the closed position at the termination of said electrical single pulse.

8. The invention defined in claim 2 further including another low inertia means mounted in said housing diametrically opposite to said low inertia means for deriving a force couple on said ring member in response to said electrical signal pulse applied thereto.

9. The invention defined in claim 2 wherein said solenoid operates in a pull mode.

10. The invention defined in claim 2 further including a flash means positioned in cooperative relationship with said ring member for closing an electrical contact when said plurality of shutter blades achieve said open position.

* * * * *